United States Patent
Du et al.

(10) Patent No.: US 11,017,322 B1
(45) Date of Patent: May 25, 2021

(54) METHOD AND SYSTEM FOR FEDERATED LEARNING

(71) Applicant: Alipay Labs (Singapore) Pte. Ltd., Singapore (SG)

(72) Inventors: Jian Du, Sunnyvale, CA (US); Benyu Zhang, Palo Alto, CA (US)

(73) Assignee: Alipay Labs (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/161,560

(22) Filed: Jan. 28, 2021

(51) Int. Cl.
*G06N 20/00* (2019.01)
*H04L 29/08* (2006.01)

(52) U.S. Cl.
CPC ............. *G06N 20/00* (2019.01); *H04L 67/10* (2013.01)

(58) Field of Classification Search
CPC .......... G06N 20/00; H04L 67/10; H04L 41/16
See application file for complete search history.

(56) References Cited

U.S. PATENT DOCUMENTS

| | | | |
|---|---|---|---|
| 8,375,030 B2 | 2/2013 | Rane et al. | |
| 8,639,649 B2 | 1/2014 | Mcsherry et al. | |
| 10,152,676 B1 * | 12/2018 | Strom ................... | G06N 7/005 |
| 10,467,234 B2 | 11/2019 | Nerurkar et al. | |
| 10,586,068 B2 | 3/2020 | Nerurkar et al. | |
| 10,657,461 B2 | 5/2020 | Mcmahan et al. | |
| 10,733,320 B2 | 8/2020 | Nerurkar et al. | |
| 10,740,693 B2 * | 8/2020 | Lazovich ............... | G06N 20/00 |
| 2018/0373988 A1 | 12/2018 | Dhanyamraju et al. | |
| 2019/0132708 A1* | 5/2019 | Belghoul ............ | H04L 12/1845 |
| 2019/0171978 A1 | 6/2019 | Bonawitz | |
| 2019/0173902 A1* | 6/2019 | Takahashi ............... | H04L 67/12 |
| 2019/0227980 A1 | 7/2019 | Mcmahan et al. | |
| 2020/0005071 A1 | 1/2020 | Kim et al. | |
| 2020/0005081 A1 | 1/2020 | Nah et al. | |
| 2020/0027019 A1 | 1/2020 | Yang et al. | |
| 2020/0202243 A1 | 6/2020 | Guttmann et al. | |
| 2020/0285980 A1 | 9/2020 | Sharad et al. | |
| 2020/0293887 A1 | 9/2020 | De Brouwer et al. | |

OTHER PUBLICATIONS

Asad et al., "FedOpt: Towards Communication Efficiency and Privacy Preservation in Federated Learning", Applied Sciences, 10, 2864; doi:10.3390/app10082864, pp. 1-17. 2020.*

(Continued)

*Primary Examiner* — Michael Won

(57) ABSTRACT

Methods, systems, and apparatuses, including computer programs encoded on computer storage media, for federal learning with differentially private (DP) intrinsic quantization are disclosed. One exemplary method may include obtaining a parameter vector of a local model; updating the parameter vector of the local model by adding a plurality of noise vectors to the parameter vector of the local model; performing quantization to the updated parameter vector to obtain a quantized parameter vector, wherein the quantization maps coordinates in the updated parameter vector to a set of discrete finite values; and transmitting, to a server, the quantized parameter vector and at least one of the plurality of noise vectors for the server to update a global model.

20 Claims, 7 Drawing Sheets

(56) References Cited

OTHER PUBLICATIONS

"Federated emnist dataset," https://github.com/tensorflow/federated/blob/master/tensorflow_federated/python/ simulation/datasets/emnist.py, retrieved on Feb. 3, 2021.
Private ML, "Pysyft, Pytorch and Intel SGX: Secure Aggregation on Trusted Execution Environments," Apr. 15, 2020, https://blog.openmined.org/pysyft-pytorch-intel-sgx/, retrieved on Feb. 3, 2021.
"TensorFlow Privacy," https://github.com/tensorflow/privacy, accessed on Feb. 3, 2021.
Abadi, M., Chu, A., Goodfellow, I., McMahan, H. B., Mironov, I., Talwar, K., and Zhang, L., "Deep learning with differential privacy," Proceedings of the 2016 ACM SIGSAC Conference on Computer and Communications Security, Oct. 24, 2016.
Agarwal, N., Suresh, A. T., Yu, F. X. X., Kumar, S., and McMahan, B., "cpSGD: Communication-efficient and differentially-private distributed SGD," Advances in Neural Information Processing Systems, May 27, 2018.
Balle, B., Kairouz, P., McMahan, H. B., Thakkar, O., and Thakurta, A., "Privacy amplification via random check-ins," arXiv preprint arXiv:2007.06605, Jul. 30, 2020.
Bernstein, J., Wang, Y.-X., Azizzadenesheli, K., and Anandkumar, A., "signSGD: Compressed Optimisation for Non-Convex Problems," arXiv preprint arXiv:1802.04434, Aug. 7, 2018.
Bonawitz, K., Ivanov, V., Kreuter, B., Marcedone, A., McMahan, H. B., Patel, S., Ramage, D., Segal, A., and Seth, K., "Practical secure aggregation for privacy-preserving machine learning," Proceedings of the 2017 ACM SIGSAC Conference on Computer and Communications Security, Oct. 2017.
Bu, Z., Dong, J., Long, Q., and Su, W. J., "Deep Learning with Gaussian Differential Privacy," arXiv preprint arXiv:1911.11607, Jul. 22, 2020.
Devlin, J., Chang, M.-W., Lee, K., and Toutanova, K., "BERT: Pre-training of Deep Bidirectional Transformers for Language Understanding," arXiv preprint arXiv:1810.04805, May 24, 2019.
Dong, J., Roth, A., and Su, W. J., "Gaussian differential privacy," arXiv preprint arXiv:1905.02383, May 30, 2019.
Dwork, C., Roth, A., et al., "The algorithmic foundations of differential privacy," Foundations and Trends in Theoretical Computer Science, vol. 9, Nos. 3-4, 2014.
Esteva, A., Kuprel, B., Novoa, R. A., Ko, J., Swetter, S. M., Blau, H. M., and Thrun, S., "Dermatologist-level classification of skin cancer with deep neural networks," Nature 542, 7639, Jan. 24, 2017.
Geiping, J., Bauermeister, H., Dröge, H., and Moeller, M., "Inverting gradients—how easy is it to break privacy in federated learning?" arXiv preprint arXiv:2003.14053, Sep. 11, 2020.
He, K., Zhang, X., Ren, S., and Sun, J., "Deep residual learning for image recognition," Proceedings of the IEEE conference on computer vision and pattern recognition, Dec. 10, 2015.
Hinton, G., Deng, L., Yu, D., Dahl, G. E., Mohamed, A.-R., Jaitly, N., Senior, A., Vanhoucke, V., Nguyen, P., Sainath, T. N., et al., "Deep neural networks for acoustic modeling in speech recognition: The shared views of four research groups," IEEE Signal processing magazine 29, Apr. 27, 2012.
Jayaraman, B., and Evans, D., "Evaluating differentially private machine learning in practice," 28th fUSENIXg Security Symposium (fUSENIXg Security 19), Aug. 12, 2019.
Kairouz, P., Oh, S., and Viswanath, P., "The composition theorem for differential privacy," International conference on machine learning, PMLR, Dec. 6, 2015.
Krizhevsky, A., Sutskever, I., and Hinton, G. E., "ImageNet classification with deep convolutional neural networks," Advances in neural information processing systems, 2012.
Li, M., and Goldman, R., "Limits of Sums for Binomial and Eulerian Numbers and their Associated Distributions," Discrete Mathematics 343, Mar. 15, 2019.

Li, T., Sahu, A. K., Zaheer, M., Sanjabi, M., Talwalkar, A., and Smith, V., "Federated optimization in heterogeneous networks," arXiv preprint arXiv:1812.06127, Apr. 21, 2020.
Liu, Z., Li, T., Smith, V., and Sekar, V., "Enhancing the privacy of federated learning with sketching," arXiv preprint arXiv:1911.01812, Nov. 5, 2019.
Mandal, K., and Gong, G., "PrivFL: Practical Privacy-preserving Federated Regressions on High-dimensional Data over Mobile Networks," Proceedings of the 2019 ACM SIGSAC Conference on Cloud Computing Security Workshop, Apr. 5, 2020.
McMahan, B., Moore, E., Ramage, D., Hampson, S., and Y Arcas, B. A., "Communication-Efficient Learning of Deep Networks from Decentralized Data," Artificial Intelligence and Statistics, Feb. 28, 2017.
McMahan, H. B., Andrew, G., Erlingsson, U., Chien, S., Mironov, I., Papernot, N., and Kairouz, P., "A General Approach to Adding Differential Privacy to Iterative Training Procedures," arXiv preprint arXiv:1812.06210, Mar. 4, 2019.
Mironov, I., "Rényi differential privacy," 2017 IEEE 30th Computer Security Foundations Symposium (CSF), IEEE, Aug. 25, 2017.
Pichapati, V., Suresh, A. T., Yu, F. X., Reddi, S. J., and Kumar, S., "AdaCliP: Adaptive Clipping for Private SGD," arXiv preprint arXiv:1908.07643, Oct. 23, 2019.
Schuchman, L., "Dither signals and their effect on quantization noise," IEEE Transactions on Communication Technology 12, 1964, 162-165.
Shaked, M., and Shanthikumar, J. G., "Stochastic orders," Springer Science & Business Media, 2007.
Thakkar, O., Andrew, G., and McMahan, H. B., "Differentially private learning with adaptive clipping," arXiv preprint arXiv:1905.03871, May 9, 2019.
Truex, S., Baracaldo, N., Anwar, A., Steinke, T., Ludwig, H., Zhang, R., and Zhou, Y., "A hybrid approach to privacy-preserving federated learning," Proceedings of the 12th ACM Workshop on Artificial Intelligence and Security, Aug. 14, 2019.
Van Der Veen, K. L., Seggers, R., Bloem, P., and Patrini, G., "Three tools for practical differential privacy," arXiv preprint arXiv:1812.02890, Dec. 7, 2018.
Wang, Y.-X., Balle, B., and Kasiviswanathan, S. P., "Subsampled rényi differential privacy and analytical moments accountant," The 22nd International Conference on Artificial Intelligence and Statistics, Dec. 4, 2018.
Wangni, J., Wang, J., Liu, J., and Zhang, T., "Gradient sparsification for communication-efficient distributed optimization," Advances in Neural Information Processing Systems, 2018, pp. 1299-1309.
Wen, W., Xu, C., Yan, F., Wu, C., Wang, Y., Chen, Y., and Li, H., "Terngrad: Ternary gradients to reduce commmunication in distributed deep learning," Advances in neural information processing systems, 2007.
Xu, R., Baracaldo, N., Zhou, Y., Anwar, A., and Ludwig, H., "Hybridalpha: An efficient approach for privacy-preserving federated learning," Proceedings of the 12th ACMWorkshop on Artificial Intelligence and Security, Dec. 12, 2019.
Zhang, C., Li, S., Xia, J., Wang, W., Yan, F., and Liu, Y., "Batchcrypt: Efficient homomorphic encryption for cross-federated learning," 2020 USENIX Annual Technical Conference, Jan. 15-17, 2020, pp. 493-506.
Zhang, H., Zheng, Z., Xu, S., Dai, W., Ho, Q., Liang, X., Hu, Z., Wei, J., Xie, P., and Xing, E. P. , "Poseidon: An efficient communication architecture for distributed deep learning on GPU clusters," 2017 USENIX Annual Technical Conference, Jul. 12-14, 2017, pp. 181-193.
Zhang X., Hong, M., Dhople, S., Yin, W., and Liu, Y. "Fedpd: A federated learning framework with optimal rates and adaptivity to non-iid data," arXiv preprint arXiv:2005.11418, Jul. 7, 2020.

* cited by examiner

400

Require: Initialize $\mathbf{w}_0$.
1: for each round $t = 1, \ldots, T$ do
2:     Select a random subset $\mathcal{K}$ of clients:
3:         $N_{k,t} = |PS_t(\mathbf{X}_k)|$
4:         $\mathbf{g}_{k,t} = \frac{1}{N_{k,t}} \sum_{\mathbf{x}_j \in PS_t(\mathbf{X}_k)} CL[\nabla \ell_k(\mathbf{w}_t; \mathbf{x}_j); C]$
5:         Send $Q[\mathbf{g}_{k,t} + \mathbf{n}_{k,t} + \mathbf{v}_{k,t}]$ to the server
6:     Server receives $Q[\mathbf{g}_{k,t} + \mathbf{n}_{k,t} + \mathbf{v}_{k,t}]$ from $k$-th client and executes:
7:         $\tilde{\mathbf{g}}_{k,t} = Q[\mathbf{g}_{k,t} + \mathbf{n}_{k,t} + \mathbf{v}_{k,t}] - \mathbf{v}_{k,t}, \forall k \in [K]$
8:         $\mathbf{g}_t = \text{SecureAgg}\left(\frac{1}{\sum_{k=1}^{K} N_{k,t}} \sum_{k=1}^{K} N_{k,t} \tilde{\mathbf{g}}_{k,t}\right)$
9:         $\mathbf{w}_{t+1} = \mathbf{w}_t - \eta \mathbf{g}_t$
10:        Send $\mathbf{w}_{t+1}$ to each client
11: end for

FIG. 4

METHOD AND SYSTEM FOR FEDERATED LEARNING

TECHNICAL FIELD

The disclosure relates generally to systems and methods for improving federated learning, and in particular, to differentially private (DP) intrinsic quantization for federal learning.

BACKGROUND

Federated learning (also known as collaborative learning) is a machine learning technique that trains an algorithm across multiple decentralized edge devices (e.g., a device providing an entry point into enterprise or service provider core networks) or servers holding local data samples without exchanging them among the edge devices. During the training process, many clients perform separate training of customized machine learning models on individual devices and then send their local updates (e.g., model gradients or model parameters) to a trusted server. Then the server aggregates these local updates to compute the global updates and sends the global updates back to the clients for model synchronizing. However, existing federated learning faces multiple challenges. In an example of a first challenge, even if the server is secured and trusted, global updates sent from the server to the client may leak information about data of other clients (also called differential attacks). It is possible for a client to faithfully reconstruct the training data of the other clients at high resolution with only the knowledge of the model gradients sent from the server. As another example of a second challenge, transmitting the local updates to the server may be communication-costly in each round as the model size increases. Because the local updates may have a large data volume, the transmission of the local updates may consume significant communication bandwidth. If insufficient bandwidth is provided, time lag will kick in and prolong the overall time for model training.

For the first challenge, existing solutions usually introduce differential privacy (DP) protection at the server side to the global updates, in order to prevent individual clients from reconstructing user data of other clients based on the received global updates. For the second challenge, existing solutions usually apply compression at the client side to compress the local updates in order to reduce the data volume of the local updates before transmitting them to the server. However, the compression alone does not address the first challenge, and DP protection does not address the second challenge. Further, it is technically challenging to combine DP protection and compression, because the known DP protection mechanisms are nearly impractically to be embedded into the known quantization processes. For example, popular DP protections are implemented by introducing noises drawing from Gaussian or Laplacian distributions in order to quantify the level of DP protection. The value range of the noises generated from these distributions is from the negative infinity and the positive infinity, which conflicts with the quantization process requiring a finite range of discrete values. Further, combining both compression and DP protection may introduce certain randomness/ noise to the data, which may significantly deteriorate the accuracy of federated learning models.

SUMMARY

Various embodiments of the present specification may include systems, methods, and non-transitory computer-readable media for federated learning (FL) with differentially private (DP) intrinsic quantization.

According to one aspect, the method for FL with DP intrinsic quantization may comprise: obtaining, by a terminal device, a parameter vector of a local model; updating, by the terminal device, the parameter vector of the local model by adding a plurality of noise vectors to the parameter vector of the local model; performing, by the terminal device, quantization to the updated parameter vector to obtain a quantized parameter vector, wherein the quantization comprises mapping coordinates in the updated parameter vector to a set of discrete finite values; and transmitting, by the terminal device to a server, the quantized parameter vector and at least one of the plurality of noise vectors for the server to update a global model.

In some embodiments, the server is coupled to each of a plurality of terminal devices; the plurality of terminal devices comprise the terminal device; and the server and the plurality of terminal devices form a federated learning network.

In some embodiments, the obtaining a parameter vector of a local model comprises: receiving, by the terminal device from the server, a parameter vector of the global model; for each of a plurality of data records of the terminal device, obtaining a gradient-based on a loss function of the local model, the parameter vector of the global model, and each of the plurality of data records; and obtaining the parameter vector of the local model by aggregating a plurality of gradients corresponding to the plurality of data records.

In some embodiments, the obtaining a parameter vector of a local model further includes: for each of the plurality of data records, performing a clipping operation on the gradient with a clipping parameter to map the gradient into a range corresponding to the clipping parameter.

In some embodiments, the obtaining the parameter vector by aggregating a plurality of gradients includes: determining the parameter vector of the local model based on a quantity of the plurality of data records and the aggregation of the plurality of the gradients.

In some embodiments, the plurality of noise vectors comprise a first noise vector and a second noise vector; the first noise vector comprises a sum of a plurality of independent random variable vectors, each of the plurality of independent random variable vectors following a uniform distribution; and the second noise vector comprises a dither vector randomizing a quantization error of the quantization.

In some embodiments, the second noise vector follows a uniform distribution and is independent from the first noise vector and the parameter vector of the local model.

In some embodiments, the transmitting the quantized parameter vector and at least one of the plurality of noise vectors comprises: transmitting the quantized parameter vector and the second noise vector to the server.

In some embodiments, the performing quantization to the updated parameter vector comprises: determining a global quantization hyper-parameter for the terminal device; determining a delta based on the global quantization hyper-parameter and a quantity of the plurality of data records; and performing the quantization based on a space determined based on the delta.

In some embodiments, the performing the quantization based on a space determined based on the delta comprises: determining a number of levels of the quantization based on the delta; and performing the quantization based on the range and the number of levels.

In some embodiments, the obtaining a parameter vector of a local model based on a plurality of data records of the terminal device comprises: sampling a subset of the plurality of data records collected by the terminal device; and obtaining the parameter vector of the local model by training the local model based on the subset of the plurality of data records.

In some embodiments, the sampling a subset of the plurality of data records comprises: sampling the subset based on a Poisson sampling rate.

According to another aspect, a system for FL with DP intrinsic quantization may comprise one or more processors and one or more non-transitory computer-readable memories coupled to the one or more processors and configured with instructions executable by the one or more processors to cause the system to perform operations comprising: obtaining a parameter vector of a local model; updating the parameter vector of the local model by adding a plurality of noise vectors to the parameter vector of the local model; performing quantization to the updated parameter vector to obtain a quantized parameter vector, wherein the quantization comprises mapping coordinates in the updated parameter vector to a set of discrete finite values; and transmitting, to a server, the quantized parameter vector and at least one of the plurality of noise vectors for the server to update a global model.

According to yet another aspect, a non-transitional computer storage media for FL with DP intrinsic quantization may be configured with instructions executable by one or more processors to cause the one or more processors to perform operations comprising obtaining a parameter vector of a local model; updating the parameter vector of the local model by adding a plurality of noise vectors to the parameter vector of the local model; performing quantization to the updated parameter vector to obtain a quantized parameter vector, wherein the quantization comprises mapping coordinates in the updated parameter vector to a set of discrete finite values; and transmitting, to a server, the quantized parameter vector and at least one of the plurality of noise vectors for the server to update a global model.

Embodiments disclosed in the specification have one or more technical effects. In some embodiments, DP protection is implemented as a part of the quantization process at the client side. This design may also be referred to as DP intrinsic quantization. DP intrinsic quantization offloads the process of providing DP protection from the server to the clients. This effectively reduces the workload on the server side and distributes this workload to multiple clients. Furthermore, DP intrinsic quantization provides stronger privacy protection as the data is DP-protected before being transmitted out of the clients. It reduces the probability of data privacy breaches even if the server is somehow comprised. Some embodiments in this application describe a quantization process that intrinsically provides DP protection. In some embodiments, the DP intrinsic quantization described herein includes a way to combine DP protection with quantization and makes it feasible to provide a mathematical way to quantify the level of DP protection. In some embodiments, the quantization process at the client side may effectively reduce the volume of the data representation for the local updates to be transmitted from clients to the server for aggregation. In some embodiments, avoiding the step of implementing DP protection on the server side may effectively reduce extra noise introduced into the federated learning (FL) model. The DP intrinsic quantization at the client side is explicitly represented as a sum-up of all the local quantization noise at the server side, which leads to the novel intrinsic generalized Irwin-Hall (GIH) mechanism for data sample level DP protection. By tuning a few hyperparameters, the described embodiments may adjust the quantization bits and the strengths of DP protection. In order to make full utilization of the quantization intrinsic noise, some embodiments described herein bring forward the DP analysis of GIH mechanism for FL training and derive the tractable expressions for the privacy guarantees of T-iterations composition for distributed stochastic gradient descent. In some embodiments, the DP intrinsic quantization offers the following advantages: (i) providing an unbiased estimate of the original local updates; (ii) fully utilizing corresponding estimate error for DP protection; (iii) integrating DP amplification via training data subsampling into the GIH-DP analyses. Consequently, the DP intrinsic quantization achieves significant performance improvement over separately conducting quantization and DP protection with the same privacy guarantee and communication efficiency.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 4 illustrates an exemplary method for FL with DP intrinsic quantization in accordance with some embodiments.

DETAILED DESCRIPTION

Figure 1:
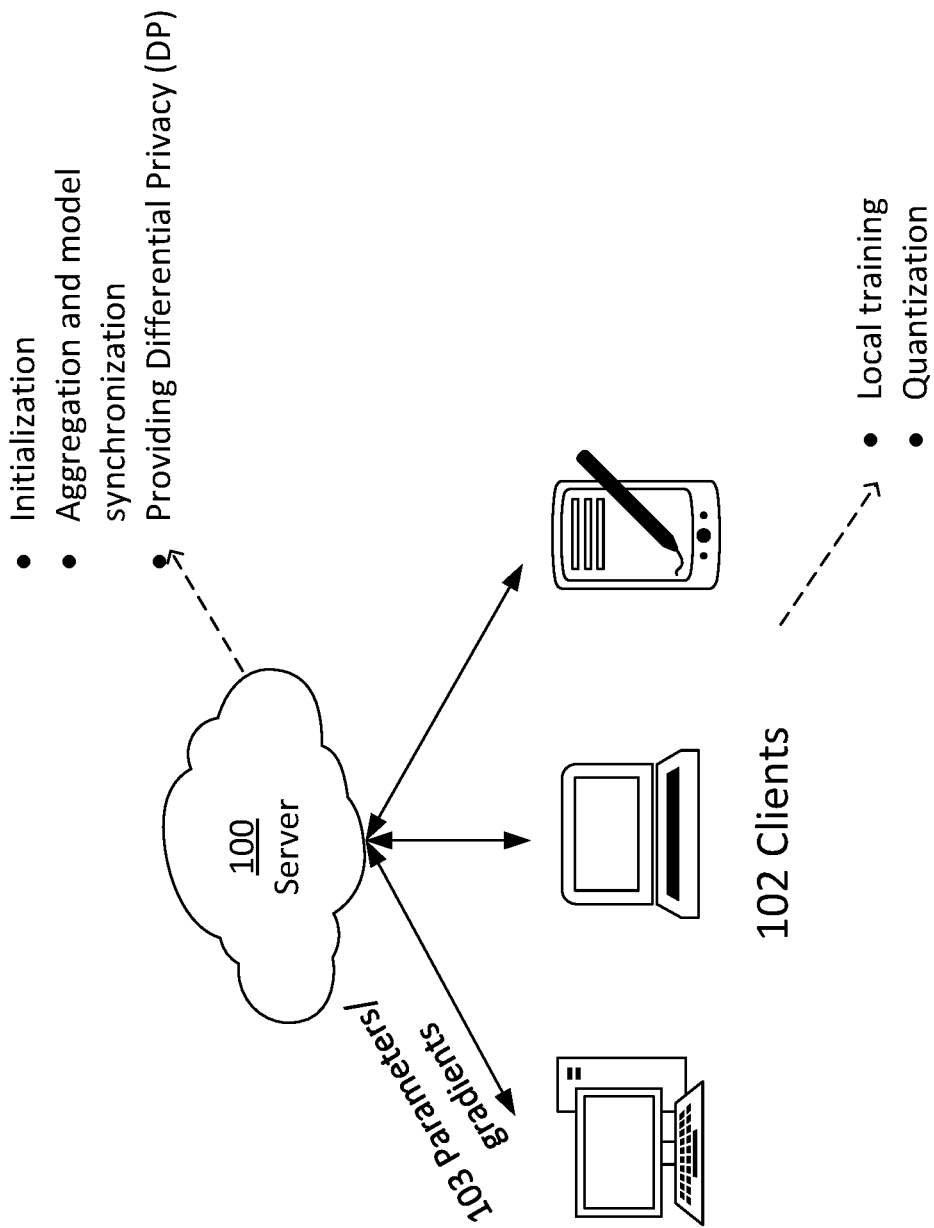
FIG. 1 illustrates an exemplary framework of federated learning (FL) in accordance with some embodiments.

Machine learning models that unleash their full power base on massive amounts of training data have achieved success in different applications, such as computer vision, speech recognition, and disease diagnosis. In a traditional machine learning pipeline, the training data among clients, such as individual customers or business entities, e.g., tech companies, banks, and hospitals, are gathered together in central servers for the model training. The limited communication bandwidth, however, limits the efficiency of data transmission. More importantly, in many cases, it is not appropriate to collect sensitive data (typing histories, location trajectory, personal photos, etc.) due to privacy and security requirements.

To address these problems, Federated Learning (FL) has been proposed, whereby many clients perform separate training of customized machine learning models on individual devices and then send their local updates (e.g., model gradients or model parameters, collectively called parameter vector) to a trusted server. Then the server aggregates these updates to compute the global updates. Federated Learning enables edge devices such as mobile phones to collaboratively learn a shared prediction model while keeping the training data on the device, decoupling the ability to do machine learning from the need to store the data in the cloud.

However, despite that the original data is not sent directly to the server in FL, the protocol is still vulnerable to differential attacks, which could originate from any party contributing during federated optimization. In such an attack, a client's contribution (e.g., local updates) during training and information about their data used for the training set may be revealed through analyzing the distributed model. As a result, when the server broadcasts the global updates directly, a client can gain information on other clients' data from the received global updates. A practical way to protect against such data breach is by perturbing the global updates randomly at the server side, which is known as Differential Privacy (DP). DP has become the de facto standard for private data release due to provable privacy protection, regardless of the adversary's background knowledge and computational power. However, while adding noise to the data prevents privacy breaches, a considerable amount of extra noise deteriorates the model accuracy significantly.

Furthermore, exchanging the model update in FL is communication costly in each round as the model size increases, especially for clients to upload local updates to the server. For example, for a medium-size PennTreeBank language model the number of parameters is 38 MB (assuming 32-bit float); the popular ResNet-50 model parameters achieve 97 MB, and a 24-layer BERT model for NLP tasks reaches 340 MB. The communication cost may further be increased as a larger number of update iterations are required before the convergence of the training model. To conquer the communication bandwidth challenge, compression techniques such as quantization have been extensively studied for point-to-point communication as well as distributed learning settings.

However, the DP protection on the server side and the quantization on the client side may both introduce noises or errors that can significantly deprave the statistical performance. In various embodiments of this disclosure, DP intrinsic quantization is described to improve the data transfer efficiency and training accuracy for federated learning.

FIG. 1 illustrates an exemplary framework of federated learning (FL) in accordance with some embodiments. Federated learning (FL) enables multiple actors to build a common, robust machine learning model without sharing data.

As shown in FIG. 1, in some embodiments, a FL framework may include a server 100 and multiple clients 102 or terminal devices, communicating via communication channels between the clients 102 and the server 100. The server 100 may be coupled to each of a plurality of clients 102 to form a federated learning network. In some embodiments, the server 100 may include a computing system or a computing device. It is to be understood that although one server 100 is shown in FIG. 1, any number of computing devices may work collectively and treated as the server 100. The server 100 may be implemented in one or more networks (e.g., enterprise networks), one or more endpoints, one or more data centers, or one or more clouds. The server 100 may include hardware or software which manages access to a centralized resource or service in a network. A cloud may include a cluster of servers and other devices which are distributed across a network.

In some embodiments, the clients 102 may include various types of terminal devices, such as a mobile phone, tablet, server, desktop computer, laptop computer, etc. The server 100 may communicate with the clients 102, and other computing devices. Communication between devices may occur over the internet, through a local network (e.g., LAN), through direct communication (e.g., BLUETOOTH™, radio frequency, infrared), etc.

FL relies on an iterative process broken up into an atomic set of client-server interactions known as a federated learning round. Each round of this process includes transmitting the current global model state to participating clients 102, respectively training local models on these local clients 102 to produce a set of potential model updates, and then aggregating and processing these local updates into a single global update and applying it to update the global model at the server 100. As shown in FIG. 1, the central server 100 aggregates and processes the local updates, while local clients 102 respectively perform local training depending on the central server 100's orders.

In some embodiments, the server 100 may be configured to implement global machine learning model initialization, local updates aggregation, and model synchronization, and differential privacy (DP) protection. The global machine learning model initialization may be treated as a starting point of a federated learning (FL) process. For example, a global machine learning model (e.g., linear regression, neural network, boosting) may be chosen to be trained on the server 100, and some initial parameters (also called a parameter vector) 103 of the global machine learning model may be broadcasted to the clients 102 for the first round of FL training. The parameter vector of the global machine learning model may include global parameters or gradients 103 of the global machine learning model. After the clients 102 perform local training based on the global parameters 103 and training data collected locally, the clients 102 may transmit local updates 104 back to the server 100 for aggregation and model synchronization.

After receiving local updates from the clients 102, the server 100 may aggregate these updates to perform global updates to the global machine learning model. The global updates may include aggregation of the local updates from the clients 102 and model synchronization based on the global machine learning model and the local updates 104. This process may generate a new set of global parameters that improve the performance of the global machine learning model.

On the clients 102 side, each of the clients 102 may obtain local updates after performing the local training based on the global parameters or gradients 103 and the local training data. The local updates may include gradients or model parameters of the locally trained model. In this disclosure, the "parameters or gradients of the local/global model" may also be referred to as "a parameter vector of a local/global model," The volume of the local updates may increase as the locally trained model size increases. In order to reduce the data transmitting cost of the local updates from the clients to the server, the local updates may go through a quantization process for mapping continuous infinite values to a smaller set of discrete finite values. For example, each floating parameter in the local updates may be represented with 32 bits. After quantization, the floating parameter may be mapped to a smaller set of values that can be represented by 4 bits. That is, the quantization may improve the transmitting efficiency by 8 times, thus reducing the requirement for communication bandwidth.

In some embodiments, the server 100 and the clients 102 may be further configured to perform other suitable operations. For example, the server 100 may perform client selection to determine which clients 102 to participate in the current round of FL learning. The server 100 and/or the clients 102 may also perform data encryption/decryption, training data sampling (e.g., subsampling mini batches), failure recovery (e.g., handing failures for disconnected clients or lost model updates), flow control (e.g., the starting and termination of the FL learning), other suitable tasks, or any combination thereof. For example, different clients (e.g., terminal devices) may be selected to participate in each FL round.

Figure 2:
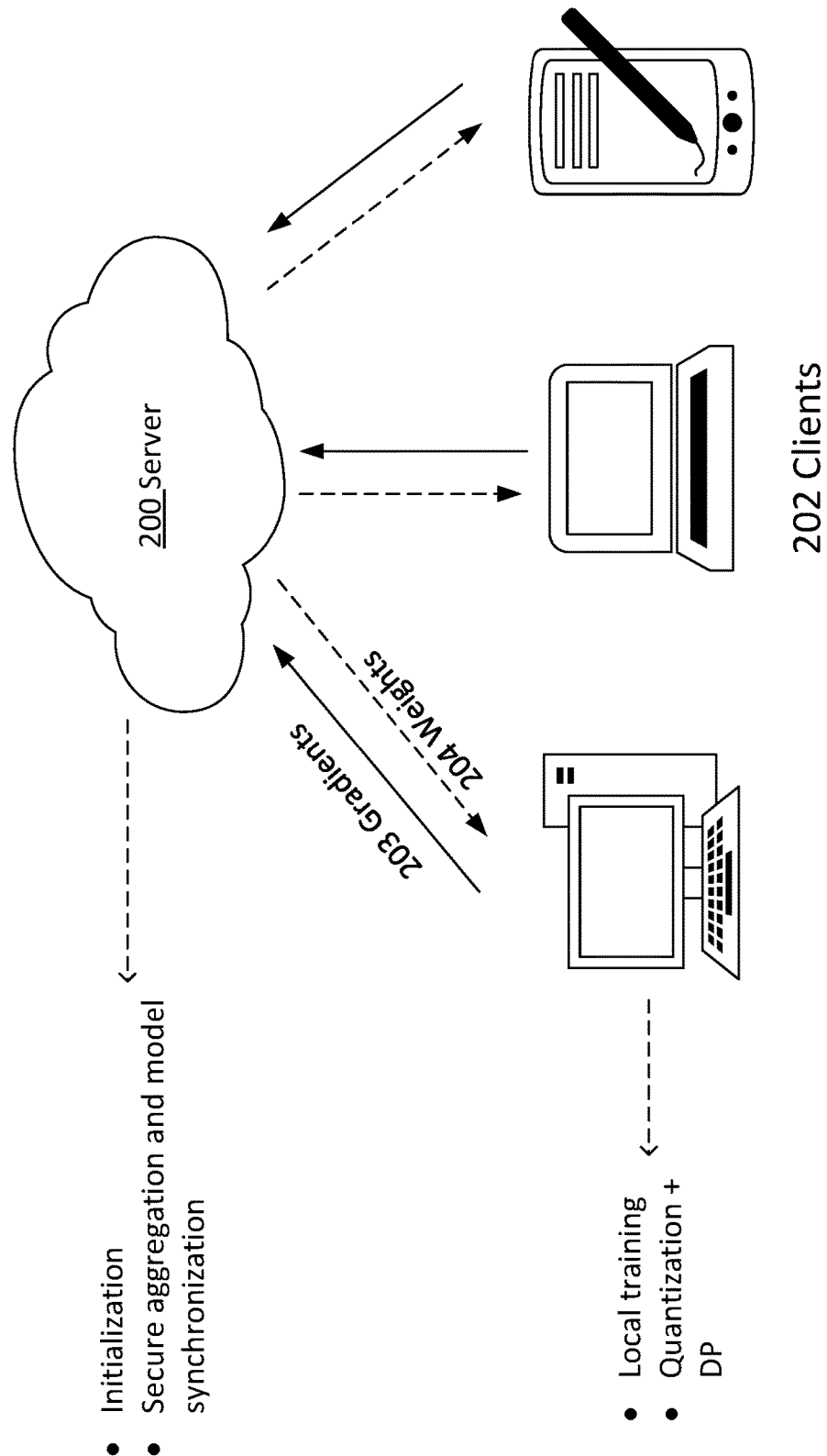
FIG. 2 illustrates an exemplary setup for FL with DP intrinsic quantization in accordance with some embodiments.

FIG. 2 illustrates an exemplary setup for FL with DP intrinsic quantization in accordance with some embodiments. In some embodiments, the quantization on the clients 202 in the FL learning may intrinsically provide DP protection to the local data before transmitting to the server 200. This DP intrinsic quantization may keep the same amount of noise added by a vanilla quantization process and at the same time provide DP protection. This way, the server 200 does not need to introduce extra noise in the FL learning to provide DP protection in a centralized manner.

In some embodiments, at the beginning of an FL training round, the server 200 may send the weights 204 of a global machine learning model to a plurality of selected clients 202 for local training. Each client 202 may obtain a gradient vector (also called parameter vector) of a local machine learning model trained based on a plurality of data records of the terminal device and the weights 204 of the global machine learning model. Before transmitting this gradient vector back to the server 200, the client 202 may obtain an updated gradient vector by adding a plurality of noise vectors to the gradient vector. In some embodiments, each of the plurality of noise vectors may follow a uniform distribution. Subsequently, the client 202 may perform quantization to the updated gradient vector to obtain a quantized gradient vector 203. The quantization operation may map coordinates in the updated gradient vector to a set of discrete finite values so that the values in the updated gradient vector may be represented with a smaller number of bits and thus the volume of data to be transferred to the server is reduced.

In some embodiments, after the quantization, the client 202 may transmit the quantized gradient vector 203 and at least one of the plurality of noise vectors to the server 200 to further train the global machine model. For example, the server 200 may perform secure aggregation on a plurality of quantized gradient vectors 203 received from a plurality of participating clients 202 and model synchronization to update the weights/parameters of the global machine learning model. Here, "secure aggregation" means that the server 200 requires a weighted-average of clients' local updates 203 for global updates without learning any of the individual's update. For example, the Diffie-Hellman key exchange protocol may be implemented to create a one-time pad between every pair of clients' updates 203 for secure aggregation at server 200. Client dropouts during the FL process may be also addressed by secret sharing of the aforementioned one-time pad between clients. Other cryptography techniques may also be implemented for secure aggregation like homomorphic encryption and function encryption. As another example, a Trusted Execution Environment (TEE) like SGX may provide another secure and efficient solution, which allows the server 200 to execute the computation of weighted-average in SGX without accessing each client's update 203.

In some embodiments, the training of the global machine learning model at the server 200 side may target to minimize a loss function $$\ell(w) = \frac{1}{N} \sum_{k=1}^{K} N_k \ell_k(w)$$

where $w \in \mathbb{R}^d$ refers to the local model parameters (e.g., gradients in real numbers received from clients 202), $l_k(w)$ refers to the loss function for the $k_{th}$ client, $N_k$ refers to the sample size of the $k_{th}$ client, and N refers to the total number of training samples, i.e., $N = \Sigma_{k=1}^{K} N_k$. The "sample size" here is the number of training records sampled on the $k_{th}$ client. Without loss of generality, the following description assumes there are $K_t$ clients 202 participate in the $t_{th}$ FL training round. Each client $k \in [K_t]$ holds a local data record $X_t$ of a distributed data set $\{X1, \ldots, X_K\}$.

In some embodiments, there are two steps in the $t_{th}$ FL training round: (1) at client k, local computed stochastic gradient $g_{k,t}$ (e.g., a vector of scalar gradients) may be compressed according to a quantization operation Q[.], and then the resultant quantized gradient $\tilde{g}_{k,t}$ 203 may be transmitted to the server, and (2) the server may aggregate $\tilde{g}_{k,t}$, $\forall k \in [K]$ to conduct model synchronizing to obtain updated parameters/weights $w_t$ 204 of a global model and broadcast $w_t$ 204 to all the clients 202.

Figure 3:
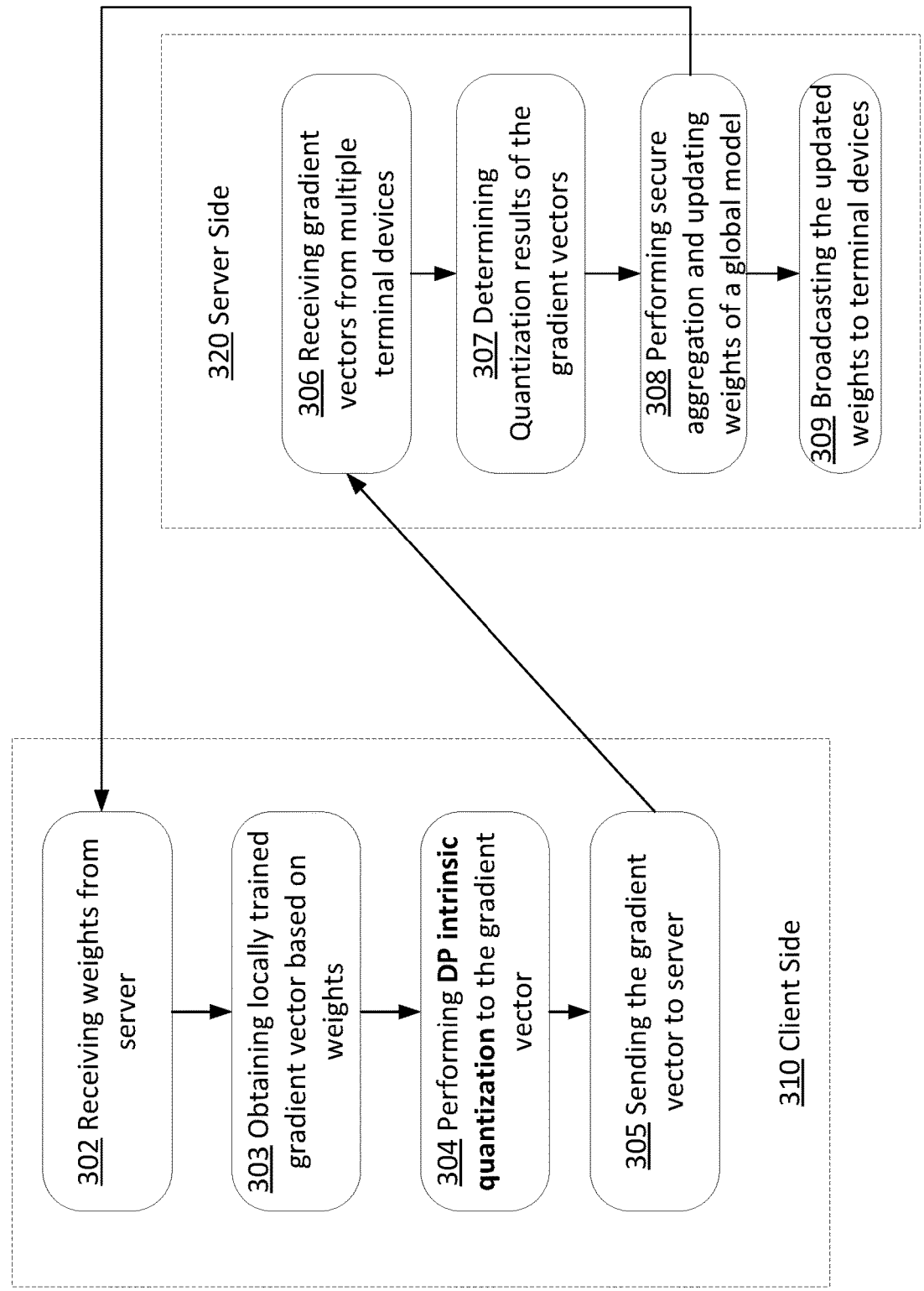
FIG. 3 illustrates an exemplary flow chart for FL with DP intrinsic quantization in accordance with some embodiments.

A randomized algorithm M(.) is $(\varepsilon, \delta)$-differentially private (DP) if for any pair of neighboring data sets X, X'$\in D^n$, and for all events $S \subseteq Range(M)$ in the output range of M, the condition $Pr[M(X) \in S] \le e^{\varepsilon} * Pr[M(X') \in S] + \delta$ is satisfied, where Pr stands for probability. When $\delta = 0$, M may be referred to as $\varepsilon$-DP. The pair $(\varepsilon, \delta)$ may be used to represent the strength of the DP protection. FIG. 3 describes the DP intrinsic quantization and the corresponding $(\varepsilon, \delta)$-DP analysis.

FIG. 3 illustrates an exemplary flow chart for FL with DP intrinsic quantization in accordance with some embodiments. The flow chart in FIG. 3 includes the operations performed on the client side 310 and the operations performed on the server side 320. The operations are for illustrative purposes. Depending on the implementation, the client side 310 and/or the server side 320 may perform more, fewer, or alternative operations in various orders or in parallel. For example, the server side 320 may select clients to participate in an FL training round. In the following description, the term "client" and the term "terminal device" may be used interchangeably to refer to computing devices performing local training in an FL framework. Example devices may include a mobile phone, tablet, server, desktop computer, laptop computer, and so on.

In some embodiments, the client 310 may receive weights of a global machine learning model at step 302 from the server 320. The weights may be initialized weights if the FL training round is the first training round, or partially trained weights if some FL training rounds have already occurred.

In some embodiments, the client 310 may obtain a gradient vector of a local machine learning model trained based on a plurality of data records of the client 310 and the received weights at step 303. The plurality of data records may include user data collected by the client 310 and are not shared with other clients or the server 320. That is, the training data is exclusively from the data records collected from the client 310. The training process performed by the client 310 may include receiving a parameter vector (e.g., a plurality of weights) of the global model; for each of a plurality of data records of the client 310, obtaining a gradient based on a loss function of the local model, the parameter vector of the global model, and each of the plurality of data records; and obtaining the gradient vector by aggregating a plurality of gradients corresponding to the plurality of data records. In some embodiments, the gradients in the gradient vector may go through a clipping operation that maps the gradient into a range corresponding to the clipping parameter. This step may restrain the impact of a locally trained gradient vector on the global model, and thus make the learning process more robust.

In some embodiments, the client 310 may perform DP intrinsic quantization to the updated gradient vector to obtain a quantized gradient vector at step 304. The DP intrinsic quantization includes mapping coordinates in the updated gradient vector to a set of discrete finite values. Furthermore, to provide a controllable DP protection protocol, the DP intrinsic quantization is designed to be adaptive to the local subsampling size of data records at each client in each round of FL training. In some embodiments, the DP intrinsic quantization includes: determining a global quantization hyper-parameter for the client 310; determining a delta based on the global quantization hyper-parameter and a quantity of the plurality of data records; and performing the quantization based on a space determined based on the delta. This delta here may define a quantization space with a plurality of quantization steps. For example, if a quantization range is from −5 to 5 and the delta is 2, the quantization space may be defined with the following quantization steps: (−5, −3), (−3, −1), (−1, 1), (1, 3), and (3, 5). When performing quantization, a floating number (e.g., 32 bits) within a quantization step may be mapped to a corresponding integer (e.g., 5 quantization steps may correspond to 5 integers, which may be represented by as few as 3 bit). In some embodiments, the performing of the quantization includes: determining a number of levels of the quantization based on the delta; and performing the quantization based on the range and the number of levels.

An example design of the DP intrinsic quantization is described herein with the following denotations: a global quantization hyper-parameter $\Delta \in R$ to control the local quantization step (may also be called a client-specific delta) $\Delta_{k,t} \in R$ at client $k \in [K_t]$ in the $t_{th}$ round of training, $N_{k,t}$ denotes the size of sub sampled data records at client k in the $t_{th}$ round of training, $M_{k,t}$ represents the number of levels of a uniform quantizer associated with the quantization step $\Delta_{k,t}$, and $Q_{k,t}[\ ]$ represents the DP intrinsic quantization with $Q_{k,t}[x] = [m_1 \Delta_{k,t}, \ldots, m_d \Delta_{k,t}]^T$. That is, the quantization is performed based on the ranges determined based on the client-specific delta $\Delta_{k,t}$ and the number of levels $M_{k,t}$ of the uniform quantizer. In some embodiments, using the above denotations, the $\Delta_{k,t}$ may be determined based on the global quantization hyper-parameter $\Delta$ and a quantity of the plurality of data records $N_{k,t}$, such as by $$\Delta_{k,t} \triangleq \frac{\Delta}{N_{k,t}}.$$

The $i_{th}$ coordinate in the $Q_{k,t}[x]$ satisfies the following inequality:

$$Q[g_{k,t}(i)] = m\Delta_{k,t}, \left(m - \frac{1}{2}\right)\Delta \leq g_{k,t}(i) < \left(m + \frac{1}{2}\right)\Delta$$

where $m \in Z$ (integers) and $g_{k,t}(i) \in R$ (real numbers) is the $i_{th}$ coordinate of $g_{k,t}$. To simplify the notation, $Q_{k,t}[\ ]$ may be replaced by Q when there is no confusion caused. This way, the quantization may be represented by:

$$Q[g_{k,t}] = [m_1 \Delta, \ldots, m_d \Delta]^T$$

However, directly applying the above quantization would result in deterministic quantization error/noise. In some embodiments, a dither noise vector $v_{k,t} \in R^d$ may be added to the quantization to randomize the quantization effects. The dither noise $v_{k,t}$ may be independent of the $g_{k,t}$ and follows a uniform distribution. In some embodiments, the dither noise vector $v_{k,t}$ may include a plurality of scalar value to be respectively added to each coordinate in the $g_{k,t}$.

In some embodiments, in addition to the dither noise $v_{k,t}$, an additional noise vector $n_{k,t} \in R^d$ may be added to the quantization input to further enhance the privacy-preserving capability. In some embodiments, $n_{k,t}$ may be a sum of Z independent random variables, each having a uniform distribution, i.e., $n_{k,t} = \sum_{j=1}^{Z} n_{k,j,t}$, where Z is a hyper-parameter to control the privacy strength. When the dither noise $v_{k,t}$ is sufficient, $n_{k,t}$ may be set to 0. With $n_{k,t}$, the input to the quantization may be denoted as $g_{k,t} + n_{k,t}$.

In a quantization with a subtractive dither quantizer, the dither noise needs to be subtracted from the quantizer output to yield the system output, i.e., $Q[g_{k,t}(i) + n_{k,t}(i) + v_{k,t}] - v_{k,t}$. For this reason, in some embodiments, the client 310 may send both the gradient vector (e.g., $Q[g_{k,t}(i) + n_{k,t}(i) + v_{k,t}]$) and the dither noise $v_{k,t}$ to the server side 320 for the server 320 to determine the system output (quantization result).

With the above denotations, the quantization error ε, which is defined as the difference between the quantizer output and input, may be represented as: $\varepsilon_{k,t} = [g_{k,t}(i) + n_{k,t}(i) + v_{k,t}] - g_{k,t} - n_{k,t} - v_{k,t}$, and the noise perturbation added to the gradient vector on the client side 310 is $\bar{g}_{k,t} = g_{k,t} + n_{k,t} + \varepsilon_{k,t}$. It means, the local DP intrinsic quantization $Q[\ ]$ at the client side 310 is equivalent to a linear mapping of $g_{k,t}$. Hence, the DP intrinsic quantization is fully compatible with the one-time padding protocol for secure aggregation implemented on the server side 320.

In some embodiments, the dither noise $v_{k,t}$ may be designed to limit $$\varepsilon(i) \sim \text{range}\left[-\frac{\Delta_{k,t}}{2}, \frac{\Delta_{k,t}}{2}\right],$$

so that the $\varepsilon_{k,t}$ and $g_{k,t} + n_{k,t}$ are statistically independent. To achieve this goal, in some embodiments, the operating range of $Q[\ ]$, denoted as $[-B_{k,t}, B_{k,t}]$, may be determined based on the delta $$\Delta_{k,t} \text{ by } B_{k,t} = C + Z * \frac{\Delta_{k,t}}{2},$$

where C is a constant parameter and Z is the number of independent random variables in the additional noise vector $n_{k,t}$. In some embodiments, once $B_{k,t}$ is determined, the number of levels of the quantization may be determined based on the delta $\Delta_{k,t}$ and the range $B_{k,t}$, for example, $$M_{k,t} = \left\lceil \frac{2B}{\Delta_{k,t}} \right\rceil.$$

With this DP intrinsic quantization, the representation of floating values (32 bits) may be reduced to $\log_2 (M_{k,t}+1)$ bits.

In some embodiments, after the server receives the gradient vectors and the dither noises from multiple clients at step 306, it may first determine the quantization results by subtracting the dither noises from the gradient vectors at step 307, and then perform secure aggregation and update the weights of the global machine learning model at step 308. An example secure aggregation may be represented as $$g_t = SecureAgg\left( \frac{1}{\sum_{k=1}^{K} N_{k,t}} \sum_{k=1}^{K} N_{k,t} \tilde{g}_{k,t} \right),$$

and the weights of the global machine learning model may be updated by $w_{t+1}=w_t-\tau g_t$, where $\tau$ refers to a learning rate. Subsequently, the server 320 may broadcast the updated weights $w_{t+1}$ to the clients to start a new round of local training. The clients that participated in the previous round may be the same or different from the ones participating in the new round.

FIG. 4 illustrates an exemplary method 400 for FL with DP intrinsic quantization in accordance with some embodiments. Method 400 describes FL learning with DP intrinsic quantization in pseudo-code format. The steps of method 400 are intended for illustrative purposes only. Depending on the implementation, method 400 may include more, fewer, or alternative steps that are implemented in various orders.

In FIG. 4, some denotations are defined first: CL(; C) refers to a clipping operation with bound parameter C, $g_{k,t}$ refers to a gradient vector in the $t_{th}$ round of learning at client k; $n_{k,t}$ refers to a uniform noise added before quantization in the $t_{th}$ round of learning at client k; Q[ ] refers to a quantization operation; PS( ) refers to a subsampling operation; $v_{k,t}$ refers to a dither noise vector in the $t_{th}$ round of learning at client k; w refers to a global machine learning model being trained by the FL learning process; Z refers to a number of uniform noises added before quantization; $\Delta$ refers to a global parameter to control the quantization level; and $\Delta_{k,t}$ refers to a quantization step used in the $t_{th}$ round of learning at client k.

In some embodiments, the FL learning may start with initializing the weights of the global machine learning model, denoted as $w_o$. This initialization step may be implemented on a server. The FL learning may involve a plurality of learning rounds, denoted as $t=1 \ldots T$, with each round involving a plurality of clients. In the $t_{th}$ round of learning, client k may be selected randomly to compute $g_{k,t}$ according to a mini-batch that is subsampled from the plurality of data records collected by client k. In some embodiments, independent but identical Poisson sampler may be adopted at different clients, which has the advantage that it is equivalently to sample the whole data set of all the clients with the same Poisson sampler. The Poisson sampler follows a Poisson sampling rate. For example, the sample $PS_t( )$ outputs a subset of the data $\{x_i | \sigma_i=1, i\in[n]\}$ by sampling $\sigma_i$ independently for $i=1, \ldots, n$. The sample size in the $t_{th}$ round at client k may be given by $N_{k,t}=|PS_t(X_k)|$, as shown in line 3 of method 400.

The line 4 of method 400 includes a local gradient computation at the client k. This computation process may include: for each of the plurality of subsampled data records (e.g., $x_j$), obtaining a gradient-based on a loss function of the client (e.g., $l_k$), a parameter vector (e.g., a plurality of weights) of the global machine learning model (e.g., $w_t$), and the data record $x_j$; and obtaining the gradient vector by aggregating a plurality of the gradients. In some embodiments, the gradient may go through a clipping operation (e.g., CL) with bound parameter C. This bound parameter C defines a clipping range, and the clipping operation may map the gradients that are outside of the clipping range into the clipping range. As shown in line 4 of method 400, the local gradient vector $g_{k,t}$ may be computed based on an aggregation of the plurality of gradients (e.g., the $\Sigma_{x_j \in PS_t(X_k)}$ CL[ ] in line 4) and a quantity of the plurality of data records (e.g., the $$\frac{1}{N_{k,t}}$$

in line 4).

In some embodiments, a plurality of noise vectors may be added to the local gradient $g_{k,t}$. The plurality of noise vectors may include a first noise vector $n_{k,t}$ and a second noise vector $v_{k,t}$. The first noise vector $n_{k,t}$ may include a sum of a plurality of independent random variable vectors, each of the plurality of independent random variable vectors following a uniform distribution. The second noise vector $v_{k,t}$ may include a dither vector for randomizing a quantization error of the quantization.

After adding the plurality of noise vectors, the resultant value $(g_{k,t}+n_{k,t}+v_{k,t})$ may be fed into the quantizer Q[ ] to obtain the quantized gradient vector. The client may send such quantized gradient vector $Q[g_{k,t}+n_{k,t}+v_{k,t}]$ along with the second noise vector $v_{k,t}$ to the server to aggregation and model synchronization.

Once the server receives the quantized gradient vector $Q[g_{k,t}+n_{k,t}+v_{k,t}]$ and the second noise vector $v_{k,t}$, it may first determine the quantization result by subtracting the second noise vector $v_{k,t}$ from the quantized gradient vector, for example, by $Q[g_{k,t}+n_{k,t}+v_{k,t}]-v_{k,t}$. The result of the subtraction may be referred to as the quantization output (from the client). Subsequently, the server may perform secure aggregation and model synchronization to update the parameters of the global machine learning model. If there is a next round of FL learning, the updated parameters may be broadcasted to the clients participating in the next round.

Figure 5:
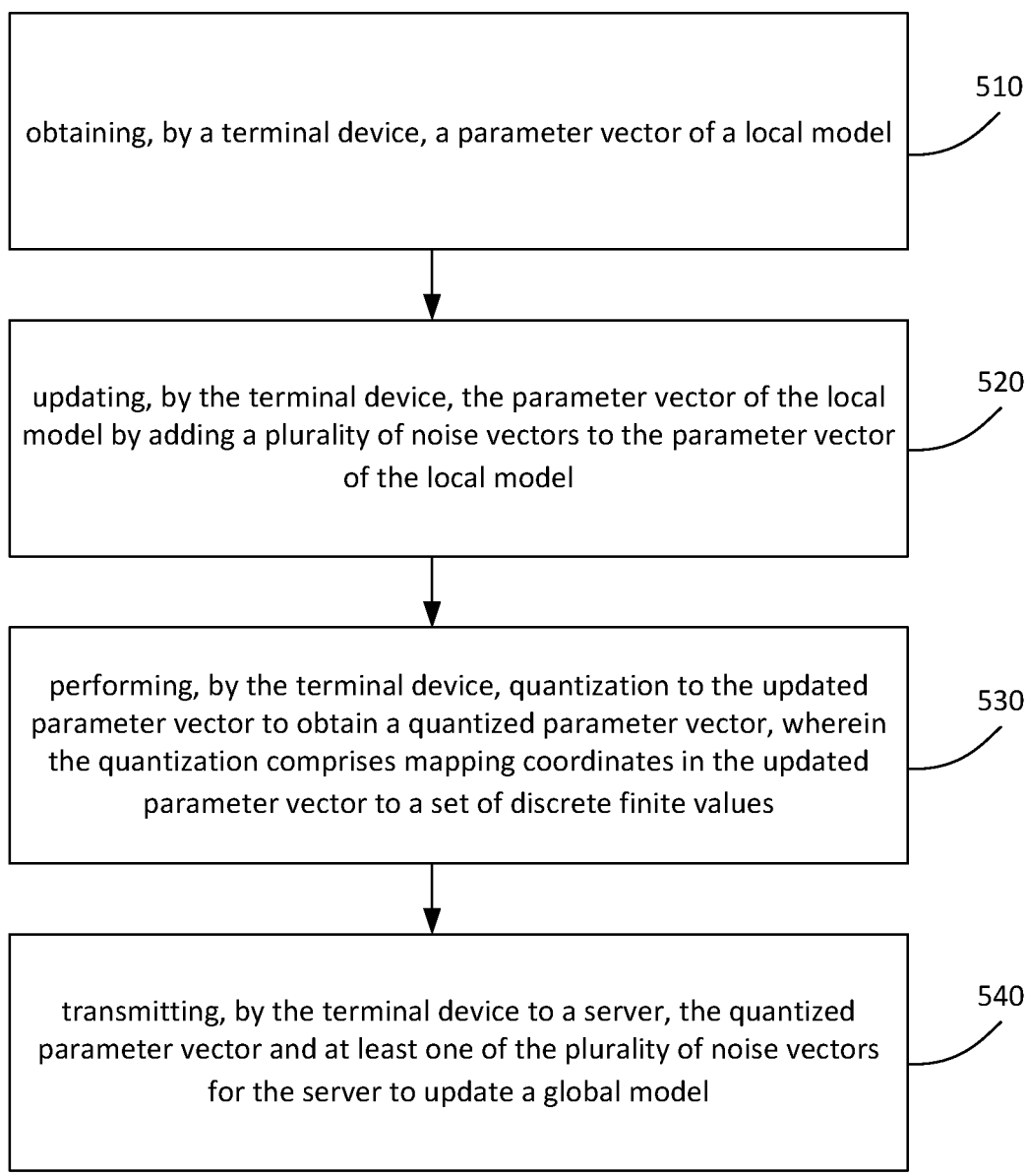
FIG. 5 illustrates an exemplary another method for FL with DP intrinsic quantization in accordance with some embodiments.

FIG. 5 illustrates an example method for FL with DP intrinsic quantization, in accordance with various embodiments. The method 500 may be performed by a device, apparatus, or system for FL. The method 500 may be performed by one or more modules/components of the environment or system illustrated by FIGS. 1-4, such as the client side 310 or the server side 320 in FIG. 3. The operations of the method 500 presented below are intended to be illustrative. Depending on the implementation, the method 500 may include additional, fewer, or alternative steps performed in various orders or in parallel.

Block 510 includes obtaining, by a terminal device, a parameter vector of a local model trained based on a plurality of data records of the terminal device. In some embodiments, the obtaining a parameter vector of a local model comprises: receiving, by the terminal device from the server, a parameter vector of the global model; for each of a plurality of data records collected by the terminal device, obtaining a gradient based on a loss function of the local model, the parameter vector of the global model, and each of the plurality of data records; and obtaining the parameter vector by aggregating a plurality of gradients corresponding to the plurality of data records. In some embodiments, the obtaining a parameter vector of a local model further comprises: for each of the plurality of data records, performing a clipping operation on the gradient with a clipping parameter to map the gradient into a range corresponding to the clipping parameter. In some embodiments, the obtaining the parameter vector by aggregating a plurality of gradients comprises: determining the parameter vector of the local model based on a quantity of the plurality of data records and the aggregation of the plurality of the gradients. In some embodiments, the obtaining a parameter vector of a local model based on a plurality of data records of the terminal device comprises: sampling a subset of the plurality of data records collected by the terminal device; and obtaining the parameter vector of the local model by training the local model based on the subset of the plurality of data records. In some embodiments, the sampling a subset of the plurality of data records comprises: sampling the subset based on a Poisson sampling rate.

Block 520 includes updating, by the terminal device, the parameter vector of the local model by adding a plurality of noise vectors to the parameter vector of the local model, wherein each of the plurality of noise vectors follows a uniform distribution. In some embodiments, the plurality of noise vectors comprise a first noise vector and a second noise vector; the first noise vector comprises a sum of a plurality of independent random variable vectors, each of the plurality of independent random variable vectors following a uniform distribution; and the second noise vector comprises a dither vector randomizing a quantization error of the quantization. In some embodiments, the second noise vector follows a uniform distribution and is independent from the first noise vector and the parameter vector of the local model.

Block 530 includes performing, by the terminal device, quantization to the updated parameter vector to obtain a quantized parameter vector, wherein the quantization comprises mapping coordinates in the updated parameter vector to a set of discrete finite values. In some embodiments, the performing quantization to the updated parameter vector comprises: determining a global quantization hyper-parameter for the terminal device; determining a delta based on the global quantization hyper-parameter and a quantity of the plurality of data records; and performing the quantization based on a space determined based on the delta. In some embodiments, the performing the quantization based on a space determined based on the delta comprises: determining a number of levels of the quantization based on the delta; and performing the quantization based on the range and the number of levels.

Block 540 includes transmitting, by the terminal device to a server, the quantized parameter vector and at least one of the plurality of noise vectors for the server to train a global model. In some embodiments, the transmitting the quantized parameter vector and at least one of the plurality of noise vectors comprises: transmitting the quantized parameter vector and the second noise vector to the server.

In some embodiments, the server is coupled to each of a plurality of terminal devices; the plurality of terminal devices comprise the terminal device; and the server and the plurality of terminal devices form a federated learning network.

Figure 6:
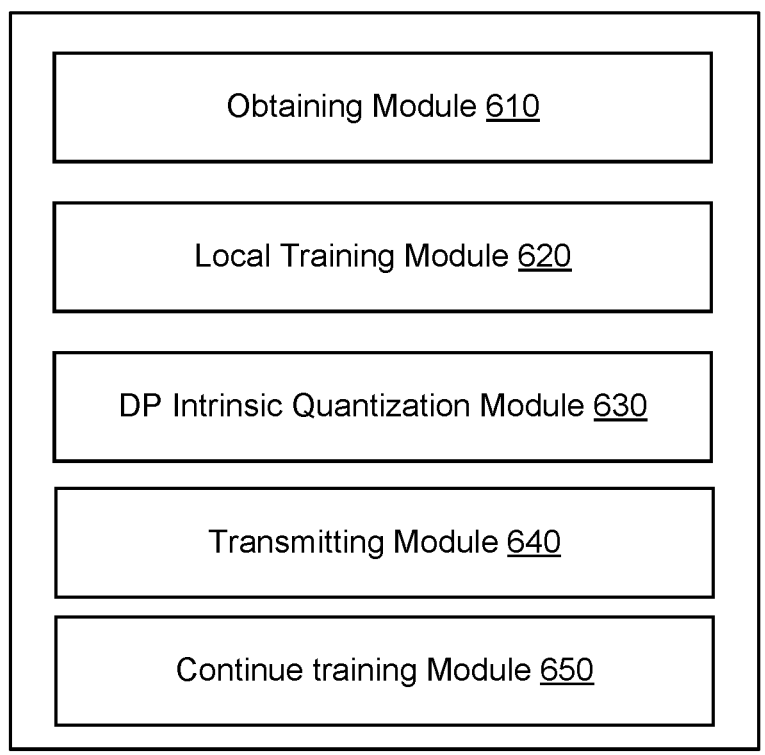
FIG. 6 illustrates a block diagram of a computer system for FL with DP intrinsic quantization in accordance with some embodiments.

FIG. 6 illustrates a block diagram of a computer system for FL with DP intrinsic quantization in accordance with some embodiments. The computer system 600 may be an example of an implementation of one or more modules in the computing system in FIGS. 2-3, or one or more other components illustrated in FIGS. 1-5. The method 500 in FIG. 5 may be implemented by the computer system 600. The computer system 600 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 500. The computer system 600 may comprise various units/modules corresponding to the instructions (e.g., software instructions).

In some embodiments, the computer system 600 may be referred to as an apparatus for FL with DP intrinsic quantization. The apparatus may comprise an obtaining module 610 for obtaining, by a terminal device, an initialized global model from a server; a local training module 620 for obtaining a parameter vector of a local model trained based on a plurality of data records of the terminal device and the initialized global model; a DP intrinsic quantization module 630 for updating the parameter vector by adding a plurality of noise vectors to the parameter vector (each of the plurality of noise vectors follows a uniform distribution) and performing quantization to the updated parameter vector to obtain a quantized parameter vector (the quantization comprises mapping coordinates in the updated parameter vector to a set of discrete finite values); a transmitting module 640 for transmitting, by the terminal device to a server, the quantized parameter vector and at least one of the plurality of noise vectors for the server to train a global model. In some embodiments, the computer system 600 may further include a continue training module 650 for receiving an updated global model from the server and performing a new round of local training with the above-described modules. The updated global model may be obtained by the server aggregating (e.g., using secure aggregation) a plurality of quantized parameter vectors from a plurality of terminal devices and model synchronization.

The techniques described herein may be implemented by one or more special-purpose computing devices. The special-purpose computing devices may be desktop computer systems, server computer systems, portable computer systems, handheld devices, networking devices or any other device or combination of devices that incorporate hardwired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) may be generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 7:
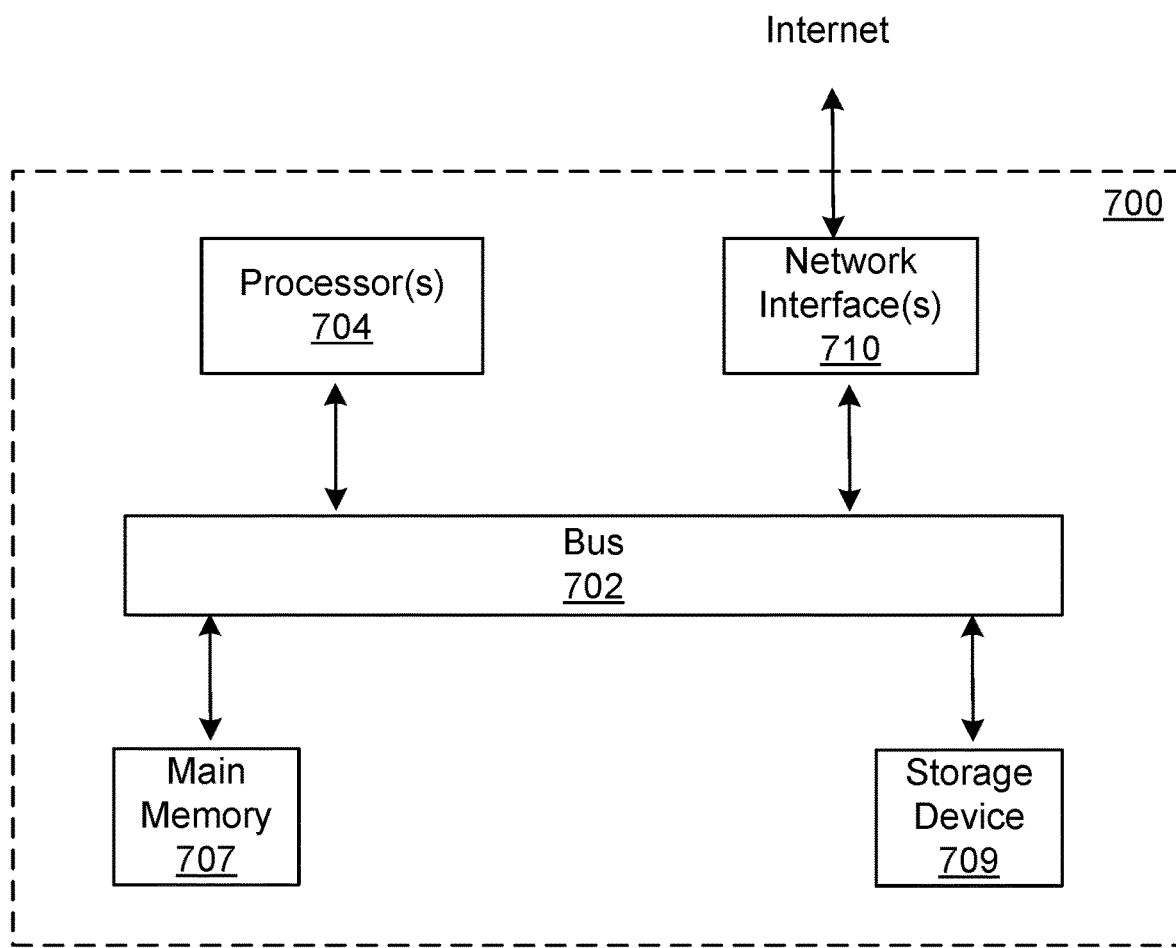
FIG. 7 illustrates an example computing device in which any of the embodiments described herein may be implemented.

FIG. 7 illustrates an example computing device in which any of the embodiments described herein may be implemented. The computing device may be used to implement one or more components of the systems and the methods shown in FIGS. 1-6 The computing device 700 may comprise a bus 702 or other communication mechanism for communicating information and one or more hardware processors 704 coupled with bus 702 for processing information. Hardware processor(s) 704 may be, for example, one or more general purpose microprocessors.

The computing device 700 may also include a main memory 707, such as a random-access memory (RAM), cache and/or other dynamic storage devices, coupled to bus 702 for storing information and instructions to be executed by processor(s) 704. Main memory 707 also may be used for storing temporary variables or other intermediate information during execution of instructions to be executed by processor(s) 704. Such instructions, when stored in storage media accessible to processor(s) 704, may render computing device 700 into a special-purpose machine that is customized to perform the operations specified in the instructions. Main memory 707 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 700 may implement the techniques described herein using customized hard-wired logic, one or more ASICs or FPGAs, firmware and/or program logic which in combination with the computing device may cause or program computing device 700 to be a special-purpose machine. According to one embodiment, the techniques herein are performed by computing device 700 in response to processor(s) 704 executing one or more sequences of one or more instructions contained in main memory 707. Such instructions may be read into main memory 707 from another storage medium, such as storage device 709. Execution of the sequences of instructions contained in main memory 707 may cause processor(s) 704 to perform the process steps described herein. For example, the processes/methods disclosed herein may be implemented by computer program instructions stored in main memory 707. When these instructions are executed by processor(s) 704, they may perform the steps as shown in corresponding figures and described above. In alternative embodiments, hard-wired circuitry may be used in place of or in combination with software instructions.

The computing device 700 also includes a communication interface 710 coupled to bus 702. Communication interface 710 may provide a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method, comprising:
obtaining, by a terminal device, a parameter vector of a local model;
updating, by the terminal device, the parameter vector of the local model by adding a plurality of noise vectors to the parameter vector of the local model;
performing, by the terminal device, quantization to the updated parameter vector to obtain a quantized parameter vector, wherein the quantization comprises mapping coordinates in the updated parameter vector to a set of discrete finite values; and
transmitting, by the terminal device to a server, the quantized parameter vector and at least one of the plurality of noise vectors for the server to update a global model.

2. The method of claim 1, wherein:
the server is coupled to each of a plurality of terminal devices;
the plurality of terminal devices comprise the terminal device; and
the server and the plurality of terminal devices form a federated learning network.

3. The method of claim 1, wherein the obtaining a parameter vector of a local model comprises:
receiving, by the terminal device from the server, a parameter vector of the global model;
for each of a plurality of data records of the terminal device, obtaining a gradient based on a loss function of the local model, the parameter vector of the global model, and each of the plurality of data records; and
obtaining the parameter vector of the local model by aggregating a plurality of gradients corresponding to the plurality of data records.

4. The method of claim 3, wherein the obtaining a parameter vector of a local model further comprises:
for each of the plurality of data records, performing a clipping operation on the corresponding gradient with a clipping parameter to map the corresponding gradient into a range corresponding to the clipping parameter.

5. The method of claim 3, wherein the obtaining the parameter vector of the local model by aggregating a plurality of gradients comprises:
determining the parameter vector of the local model based on a quantity of the plurality of data records and the aggregation of the plurality of gradients.

6. The method of claim 3, wherein the performing quantization to the updated parameter vector comprises:
determining a global quantization hyper-parameter;
determining a delta based on the global quantization hyper-parameter and a quantity of the plurality of data records; and
performing the quantization based on a space determined based on the delta.

7. The method of claim 6, wherein the performing the quantization based on a space determined based on the delta comprises:
determining a number of levels of the quantization based on the delta; and
performing the quantization based on a range and the number of levels.

8. The method of claim 1, wherein:
the plurality of noise vectors comprise a first noise vector and a second noise vector;
the first noise vector comprises a sum of a plurality of independent random variable vectors, each of the plurality of independent random variable vectors following a uniform distribution; and
the second noise vector comprises a dither vector randomizing a quantization error of the quantization.

9. The method of claim 8, wherein the second noise vector follows a uniform distribution and is independent from the first noise vector and the parameter vector of the local model.

10. The method of claim 8, wherein the transmitting the quantized parameter vector and at least one of the plurality of noise vectors comprises:
transmitting the quantized parameter vector and the second noise vector to the server.

11. The method of claim 1, wherein the obtaining a parameter vector of a local model comprises:
sampling a subset of a plurality of data records collected by the terminal device; and
obtaining the parameter vector of the local model by training the local model based on the subset of the plurality of data records.

12. The method of claim 1, wherein the sampling a subset of the plurality of data records comprises:
sampling the subset based on a Poisson sampling rate.

13. A system comprising one or more processors and one or more non-transitory computer-readable memories coupled to the one or more processors and configured with instructions executable by the one or more processors to cause the system to perform operations comprising:
obtaining a parameter vector of a local model;
updating the parameter vector of the local model by adding a plurality of noise vectors to the parameter vector of the local model;
performing quantization to the updated parameter vector to obtain a quantized parameter vector, wherein the quantization comprises mapping coordinates in the updated parameter vector to a set of discrete finite values; and
transmitting, to a server, the quantized parameter vector and at least one of the plurality of noise vectors for the server to update a global model.

14. The system of claim 13, wherein the obtaining a parameter vector of a local model comprises:
receiving, from the server, a parameter vector of the global model;
for each of a plurality of data records collected by the system, obtaining a gradient based on a loss function of the local model, the parameter vector of the global model, and each of the plurality of data records; and
obtaining the parameter vector of the local model by aggregating a plurality of gradients corresponding to the plurality of data records.

15. The system of claim 14, wherein the obtaining a parameter vector of a local model further comprises:
for each of the plurality of data records, performing a clipping operation on the gradient with a clipping parameter to map the gradient into a range corresponding to the clipping parameter.

16. The system of claim 13, wherein:
the plurality of noise vectors comprise a first noise vector and a second noise vector;
the first noise vector comprises a sum of a plurality of independent random variable vectors, each of the plurality of independent random variable vectors following a uniform distribution; and the second noise vector comprises a dither vector randomizing a quantization error of the quantization.

17. The system of claim 13, wherein the performing quantization to the updated parameter vector comprises:
   determining a global quantization hyper-parameter;
   determining a delta based on the global quantization hyper-parameter and a quantity of the plurality of data records; and
   performing the quantization based on a space determined based on the delta.

18. A non-transitory computer-readable storage medium for determining routine, configured with instructions executable by one or more processors to cause the one or more processors to perform operations comprising:
   obtaining a parameter vector of a local model;
   updating the parameter vector of the local model by adding a plurality of noise vectors to the parameter vector of the local model;
   performing quantization to the updated parameter vector to obtain a quantized parameter vector, wherein the quantization comprises mapping coordinates in the updated parameter vector to a set of discrete finite values; and
   transmitting, to a server, the quantized parameter vector and at least one of the plurality of noise vectors for the server to update a global model.

19. The non-transitory computer-readable storage medium of claim 18, wherein:
   the plurality of noise vectors comprise a first noise vector and a second noise vector;
   the first noise vector comprises a sum of a plurality of independent random variable vectors, each of the plurality of independent random variable vectors following a uniform distribution; and
   the second noise vector comprises a dither vector randomizing a quantization error of the quantization.

20. The non-transitory computer-readable storage medium of claim 18, wherein the performing quantization to the updated parameter vector comprises:
   determining a global quantization hyper-parameter;
   determining a delta based on the global quantization hyper-parameter and a quantity of the plurality of data records; and
   performing the quantization based on a space determined based on the delta.

* * * * *